H. C. BJERING.
MOWER AND SIMILAR MACHINE.
APPLICATION FILED JAN. 31, 1912.
1,101,052.
Patented June 23, 1914.
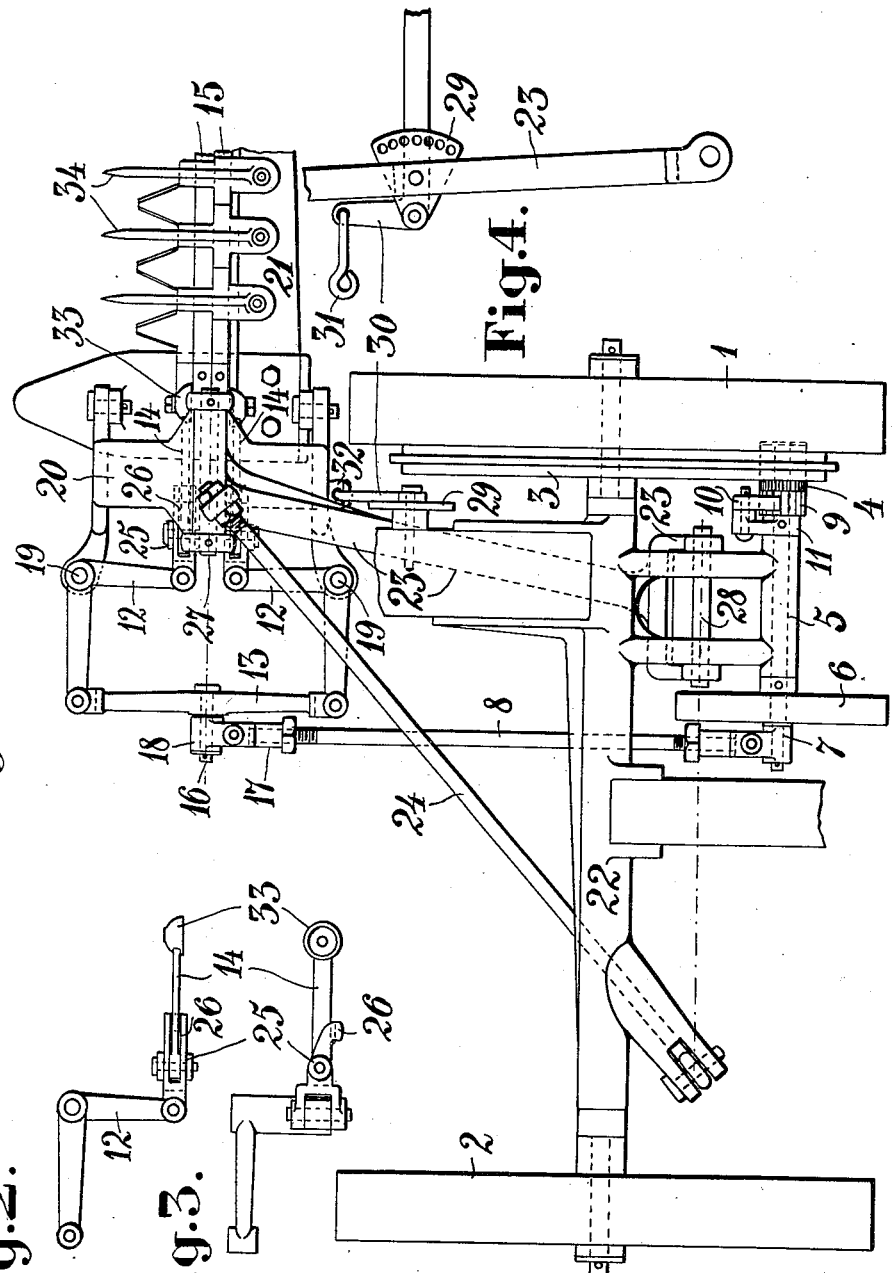
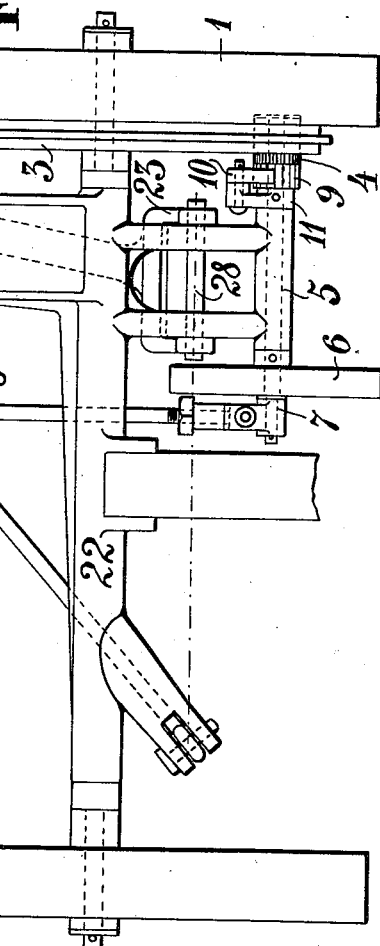
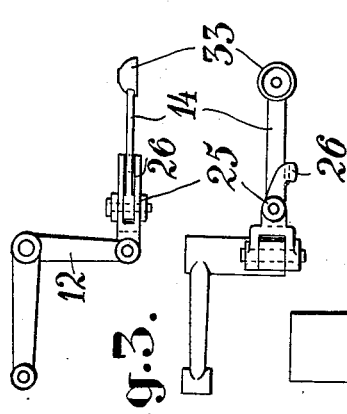
Witnesses:
Inventor:
Hans Christian Bjering
per
Lawrence Langner.
Attorney.

UNITED STATES PATENT OFFICE.

HANS CHRISTIAN BJERING, OF GJÖVIK, NORWAY, ASSIGNOR TO KRISTIAN HALMRAST, OF SÖNDRE LAND, NORWAY.

MOWER AND SIMILAR MACHINE.

1,101,052.  Specification of Letters Patent.  Patented June 23, 1914.

Application filed January 31, 1912. Serial No. 674,572.

*To all whom it may concern:*

Be it known that I, HANS CHRISTIAN BJERING, a subject of the King of Norway, residing at Gjövik, Norway, have invented certain new and useful Improvements in Mowers and Similar Machines; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

This invention relates to driving mechanism for mowers in which two knives are reciprocated in opposite directions by double bell-crank mechanism operated from the wheels of the machine.

In mechanism of the kind referred to the bell-crank levers are generally located in such a position with regard to the path in which the knife blades reciprocate that the thrust thereof on the blades has a tendency to displace the latter out of their normal direction and to produce excessive friction. In accordance with the present invention these defects are obviated by connecting up the bell-crank levers with the knife blades and the intermediate operating levers in such a manner that the thrust is solely in the direction of movement of said blades.

The machine embodying the invention is illustrated in the accompanying drawing in which:

Figure 1 represents a plan illustrating the essential parts of a mower constructed in accordance with the present invention. Figs. 2, 3 and 4 are details.

The wheels 1 and 2 of the mower both rotate on fixed axles as in well known vehicles and contrary to what is the case in other mowers commonly used in which the knives are driven from the axle of the said wheels, which axle during the operation of the machine is rotated in the frame of the latter by both of said wheels. Secured to the wheel which is on the same side of the machine as the cutting apparatus, is a cylindrical toothed ring 3 meshing with a pinion 4 the shaft 5 of which carries a flywheel 6, and on its outer end, a crank 7 connected by a pitman 8 with the bell-crank lever mechanism of the knife bars. The spur wheel 4 is loose on the shaft 5 and provided, on the side facing the machine, with a pawl and ratchet wheel 9 integral with the spur wheel 4. When driving forward this ratchet wheel is engaged by the pawl 10 connected by the arm 11 with the shaft 5 so as to transmit rotation to the latter. When driving backward the pawl rides on the ratchet wheel and the shaft 5 remains stationary. If the knives are desired to remain inoperative, the pawl is lifted and kept out of engagement both in the forward and in the backward motion. The bell crank lever mechanism for the knife bars comprises two bell crank levers 12 connected with each other at one of their ends by means of a rod 13 and each connected at the other end with one knife bar 15 through the intermediary of guiding rods 14. In the middle of the rod 13 is a pin 16 with which the pitman 8 is connected by means of fork 17 and a bearing 18. The pitman 8 is threaded in the fork 17 and by screwing the fork on the threaded portion of the pitman the relative position of the knife blades can be adjusted. The bell crank levers 12 operate on substantially the same level as the knife bars 15 and are mounted to turn on pivots 19 on the frame or fork 20 of the finger bar 21 so as to be taken along when the latter is moved up or down or when the stubble regulator 29 is adjusted. The connecting rods 14 of the knife bars are provided with a joint 25 arranged so as to allow the rods to turn upwardly but downwardly only until engaging the stop 26. This is in order to allow of raising the finger bar up to any one of the positions which the bell crank levers and the knives may occupy and the stop 26 serves to prevent the knives from dropping down when the finger bar is raised.

The bar 23 either alone or in connection with the transverse member or stay 24 holds the frame 20 with the bell crank levers and cutting apparatus fast on the machine and in the right position relatively to the running axle both horizontally and vertically and also in proper distance apart from the shaft 5, either when moving the cutting apparatus up or down or when stubble adjustment is operated, while the bolt 28, which is parallel to the axles of the running wheel, holds the bar 23 to the frame of the machine so as to allow it to turn only through a certain path. The other end of the bar 23 keeps the bolt 27 parallel with the axle of the running wheels and the pin 16 is on the same center line when the bell crank levers are at the middle of their throw. The cutting apparatus as a whole turns on the bolt 27. The bar 23 is sufficiently rigid to hold the finger bar sustained in horizontal position and to avoid, with or without the aid of the transverse member 24 to yield sidewise. The transverse member is mounted to turn on the same axis as the bar 23.

The rod 13 of the bell crank lever mechanism is located at such a height as to be as far as possible in alinement with the pitman 8 when the machine is working. In order to reduce the angle between the extreme positions of the pitman the driving shaft 5 should always be located on the opposite side of the running axle relatively to the cutting apparatus so as to render the rod as long as possible.

As that end of the bell crank levers to which the guiding rods 14 are secured operates in the same plane as the knife bars 15 and as the guiding bars 14 move parallel to each other, the further advantage is realized in regard to other machines of known types in that no bend and consequently no friction will arise on this point, the most exposed one of the machine.

The stubble regulator 29 is mounted on the bar 23 and connected with the cutting apparatus by means of bell crank lever 30, a member terminating in an eye 31, and lug 32 on the frame 20. By this arrangement the cutting apparatus when elevated or lowered will always remain in the same position relatively to the bar 23 and the whole can be elevated or lowered without hindrance of any other connection with the frame of the machine than the bar 23. In all mowers of known types the stubble regulator is secured to the frame by means of a separate rod which tends to hinder movement of the stubble regulator.

Owing to the described arrangement of the elements of the driving mechanisms and the bell crank lever mechanism the weight is considerably reduced; the manipulation and surveyance of the mechanism are simple and easy and require no skilled attendant.

Claims:

1. A mower comprising a plurality of oppositely reciprocating knives, knife bars therefor, bell crank levers connected to said knife bars at one end, a rod connecting said bell crank levers, a pitman connected to said rod at one end, and mechanism connecting the other end of the pitman with driving mechanism on one of the wheels of the mower, substantially as described.

2. A mower comprising a plurality of oppositely reciprocating knives, knife bars therefor, a rod, bell crank levers connected to said knife bars at one end and joined by said rod at their other ends, a pitman connected to said rod, and mechanism connecting the pitman with one of the wheels of the mower, whereby the knives are reciprocated in the forward movement of the machine and are in operation on the backward movement of the latter, substantially as described.

3. A mower comprising a plurality of oppositely reciprocating knives, knife bars therefor, a rod, bell crank levers connected to said knife bars at one end and joined by said rod at their other ends, a pitman connected to said rod, a shaft to which said pitman is connected, a pinion on said shaft and an internally toothed ring on one of the wheels of the mower with which said pinion meshes, substantially as described.

4. A mower comprising a pair of oppositely reciprocating knives, bell crank levers connected with said knives at one end, and pivoted to the knife bar frame, a rod connecting the bell crank levers, and means for connecting said rod with one of the wheels of the mower for actuating the knives, substantially as described.

In testimony that I claim the foregoing as my invention, I have signed my name in presence of two subscribing witnesses.

HANS CHRISTIAN BJERING.

Witnesses:
NANA SCHIAUDER,
MARLIN GUTTORMSEN.